July 26, 1955  W. SIX ET AL  2,714,162
RELAXATION GENERATOR
Filed May 9, 1951
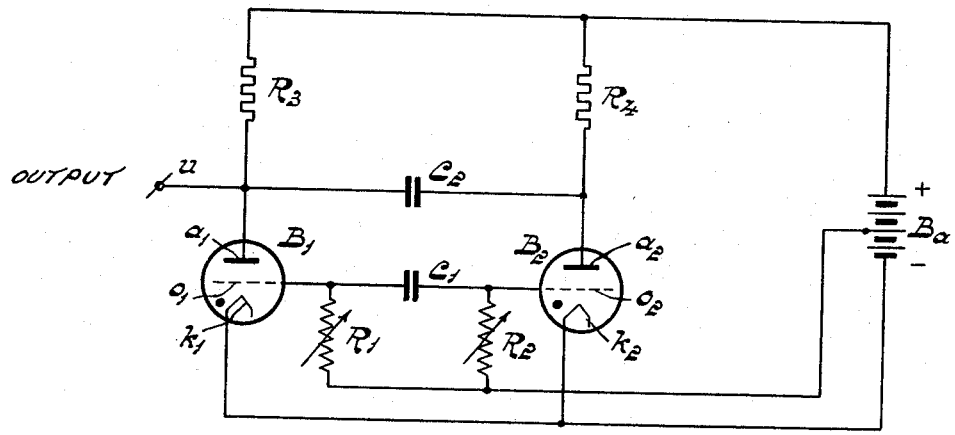
INVENTORS
WILLEM SIX
JACOBUS DOMBURG
BY *Fred M. Vogel*
AGENT

United States Patent Office 2,714,162
Patented July 26, 1955

2,714,162
RELAXATION GENERATOR

Willem Six and Jacobus Domburg, Eindhoven, Netherlands, assignors to Hartford National Bank and Trust Company, Hartford, Conn., as trustee Application May 9, 1951, Serial No. 225,306

Claims priority, application Netherlands June 29, 1950

3 Claims. (Cl. 250—36)

This invention relates to a relaxation generator comprising two gas filled discharge tubes for producing a periodically altered voltage.

It has previously been suggested to provide a relaxation generator of this kind in which respective electrodes of the gas tubes are interconnected and connected to a negative terminal of a supply source and in which the other electrodes of the tubes are coupled together via a capacitor and in addition are each connected via a resistor to a positive terminal of the supply source. In this circuit arrangement the gas tubes are alternatively conductive and the capacitor is charged alternatively in one direction and in the other direction. The periods during which a gas tube is conductive or extinguished are variable independently of each other, by variation of the value of the resistors.

Such relaxation generators may be used, for example, for producing a sawtooth voltage for a television device or for a multiplex telephony system or for the control of a device for producing periodically interrupted ringing in an automatic telephony system. In the latter case the time constants of the circuit may be adjusted so that a gas tube is conductive for one second and is extinguished for five seconds.

The known circuit arrangement is only capable of supplying comparatively little energy since the values of the resistors must be comparatively high to establish a high time constant.

A second limitation of the known circuit arrangement is that the relaxation times depend on the value of the load.

The circuit arrangement according to the invention obviates the said disadvantages.

In the circuit arrangement according to the invention, the gas tubes each comprise a cold cathode, a control grid, and an anode, the cathodes of the tube being interconnected and connected to a negative terminal of the supply source, the control grids being coupled together via a capacitor and being each connected via a resistor to a positive terminal of the supply source. In addition, the anodes are coupled together via a second capacitor and are each connected to a positive terminal of the supply source via a resistor, the output voltage being obtained from the anode circuit of at least one of the tubes.

In order that the invention may be more clearly understood and readily carried into effect, it will now be described more fully with reference to the accompanying drawing.

Referring to the single figure of the drawing, gas-filled tubes $B_1$ and $B_2$ each comprise cold cathodes $k_1$ and $k_2$, respectively, control grids $O_1$ and $O_2$, respectively, and anodes $a_1$ and $a_2$, respectively.

The cathodes $k_1$ and $k_2$ are connected to the negative terminal of the supply battery $Ba$. The control grids $O_1$ and $O_2$ are connected, via resistors $R_1$ and $R_2$, to a tap on the battery and are coupled together by a capacitor $C_1$. The anodes $a_1$ and $a_2$ are similarly connected, via resistors $R_3$ and $R_4$, to the positive terminal of the battery and are coupled together by a condenser $C_2$. The output voltage is obtained from a U which is connected to the anode of tube $B_1$.

This circuit operates as follows: At a given instant the tube $B_1$ is conductive and the tube $B_2$ extinguished. The condenser $C_1$ is then charged in a circuit of the tap on battery $Ba$ via resistor $R_2$, capacitor $C_1$ and ignition path between control grid $O_1$ and cathode $k_1$ to the negative terminal of the battery. During this process, the control grid $O_1$ has a substantially constant potential and the potential of the control grid $O_2$ increases at a rate which depends on the time constant of capacitor $C_1$ and resistor $R_2$. The potential of anode $a_1$ is equal to the operating voltage of tube $B_1$. The voltage of the battery $Ba$ is higher than the operating voltage but lower than the anode voltage which would ignite a tube if there were no discharge between cathode and control grid. This prevents the main discharge path between anode $a_2$ and cathode $K_2$ of tube $B_2$ from conducting current until the auxiliary discharge path between cathode $k_2$ and ignition electrode $O_2$ conducts current.

As soon as the potential of the control grid $O_2$ has increased beyond the ignition voltage associated with this grid, the auxiliary discharge path between electrode $O_2$ and cathode $k_2$ conducts current causing the main discharge path between the anode $a_2$ and cathode $k_2$ to conduct current. The potentials of the control grid $O_2$ and the anode $a_2$ suddenly decrease and a negative pulse is fed via the capacitors $C_1$ and $C_2$ to control grid $O_1$ and the anode $a_1$ of tube $B_1$. Consequently, the potential of these electrodes drops below the operating voltage to such an extent that the tube $B_1$ is extinguished.

Capacitor $C_1$ is then charged in the opposite direction in a circuit from the tap on the battery $Ba$ via resistor $R_1$, capacitor $C_1$ and the auxiliary ignition path of tube $B_2$, across which the voltage is constant during this period, to the negative terminal of the battery. The potential of the control grid $O_1$ of tube $B_1$ thus increases at a rate which depends on the time constant of capacitor $C_1$ and resistor $R_1$ and is thus independent of the value of resistor $R_2$. The rate of variation of the voltage of the control grid $O_1$ is consequently independent of the rate of variation of the voltage of grid $O_2$ during the other period. The duration of the periods over which the capacitor $C_1$ is charged in one direction and in the other direction may consequently be adjusted independently of each other by variation of the resistors $R_1$ and $R_2$.

During this period, the voltage of the anode $a_2$ of tube $B_2$ is constant and equal to the operating voltage of the tube and the potential of the point U increases. As soon as the voltage of the grid $O_1$ of tube $B_1$ has become equal to the ignition voltage of the auxiliary discharge path of tube $B_1$, the auxiliary discharge path becomes conductive and, hence, also the main discharge path, with the result that the voltages of the grid $O_1$ and of the anode $a_1$ are suddenly reduced. A negative pulse is passed via capacitors $C_1$ and $C_2$ to the grid $O_2$ and anode $a_2$ of tube $B_2$ so that tube $B_2$ is extinguished, the sequence being then repeated in the manner hereinbefore described.

It should be noted that the voltage of a control grid of a tube, during the time over which the tube is conductive, is substantially independent of the current passing through the main discharge path of the tube and, hence, of the load of the anodes, so that also the charging rate of the condenser $C_1$, and, hence, the duration of the relaxation periods, is independent of the load.

What we claim is:

1. A relaxation oscillator for producing a periodically altered voltage, said oscillator comprising two gaseous discharge tubes, each tube having a cold cathode, a control electrode, and an anode, first, second, third and fourth resistances, means to supply a first positive potential relative to said cold cathodes to the anodes of said tubes through said first and second resistances respectively, said anodes being capacitively intercoupled, means to supply a second positive potential relative to said cathodes to the control electrodes of said tubes through said third and fourth resistances respectively, said control electrodes being capacitively intercoupled, and means to derive said periodically altered voltage from the anode of one of said tubes.

2. A relaxation oscillator for producing a periodically altered voltage, said oscillator comprising two gaseous discharge tubes, each tube having a cold cathode, a control electrode, and an anode, first and second resistances, means to supply a first positive potential relative to said cold cathodes to the anodes of said tubes through said first and second resistances respectively, a first capacitance intercoupling said anodes, third and fourth resistances, means to supply a second positive potential relative to said cold cathodes to the control electrodes of said tubes through said third and fourth resistances respectively, said second positive potential being smaller than said first positive potential, a second capacitance intercoupling said control electrodes, and means to derive said periodically altered voltage from the anode of one of the tubes.

3. A relaxation oscillator as set forth in claim 2 wherein said third and fourth resistances are constituted by variable resistors.

References Cited in the file of this patent

UNITED STATES PATENTS

| 1,947,093 | Knowles | Feb. 13, 1934 |

FOREIGN PATENTS

| 662,123 | Germany | July 9, 1936 |
| 122,842 | Australia | Dec. 5, 1946 |